Aug. 28, 1951
J. W. ANDERSON, JR
2,566,155
HAND BRAKE SIGNAL
Filed April 15, 1949
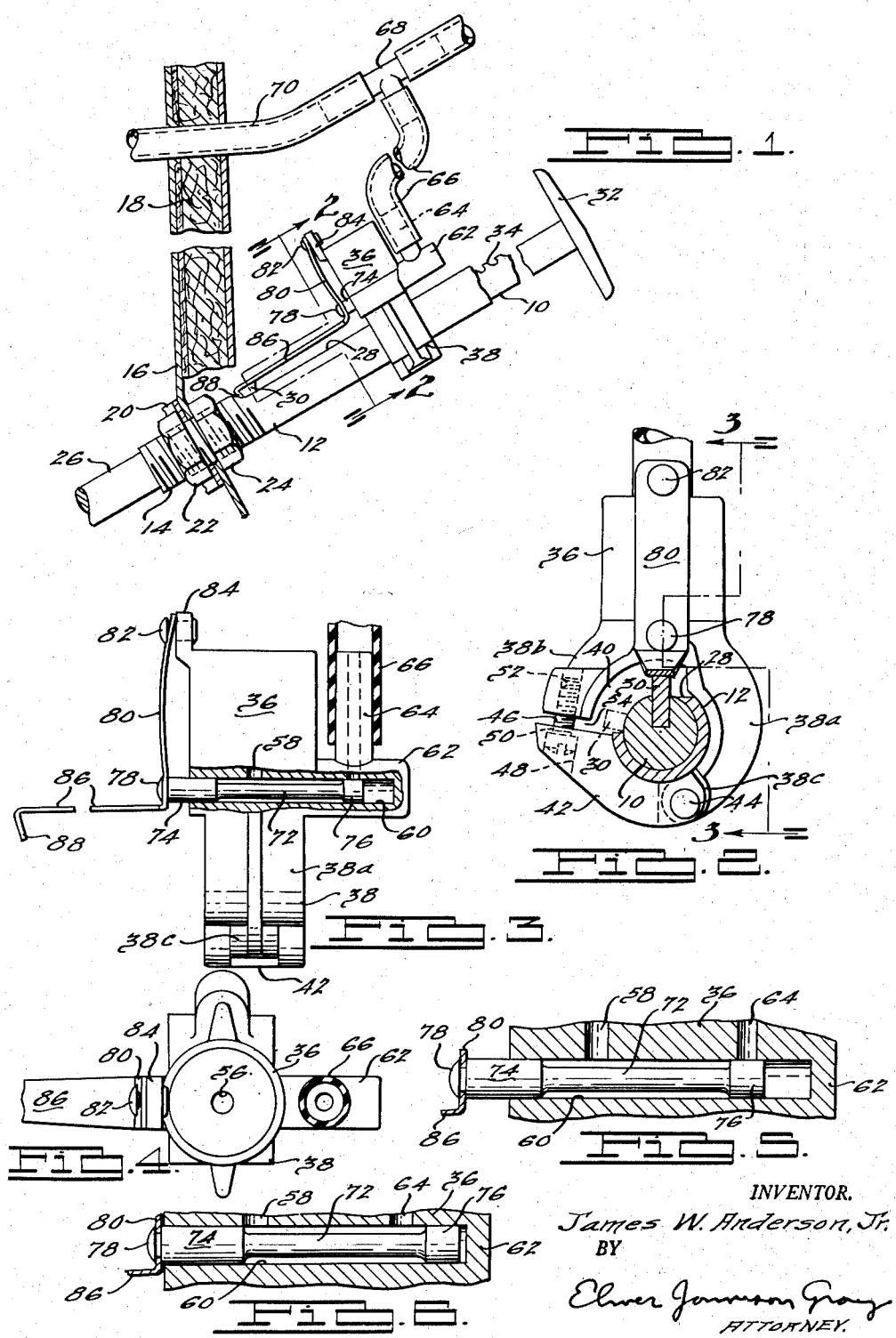
INVENTOR.
James W. Anderson, Jr.
BY
Elmer Johnson Gray
ATTORNEY.

Patented Aug. 28, 1951

2,566,155

UNITED STATES PATENT OFFICE 2,566,155

HAND BRAKE SIGNAL

James W. Anderson, Jr., Detroit, Mich., assignor to Accessory Research Corporation, Detroit, Mich., a corporation of Michigan Application April 15, 1949, Serial No. 87,781

9 Claims. (Cl. 116—67)

This invention relates to a new and novel brake warning signal particularly but not exclusively adapted for use in motor vehicles and is so constructed that when the engine of said vehicle is running an audible signal will warn the driver of the vehicle when the emergency hand brake member has not been wholly or partly released. This invention will be useful in preventing wear and destruction of brake lining caused by failure of the operator of the vehicle to release the emergency brake before placing the vehicle in motion.

An object of the invention is to provide a means automatically operable when starting a vehicle engine or while the engine is running to warn the driver of such vehicle that the emergency brake member has not been partly or wholly released.

A still further object of the invention is to provide a vacuum actuated device connected to the engine manifold or other vacuum source of a motor vehicle, said device being operable to warn the driver of the vehicle that the brake has not been partly or wholly released.

A still further object of the invention is to provide an audible brake warning signal composed of a conventional noise producing means, such for example as a whistle, said signal to derive its operating power from the manifold vacuum of a vehicle engine and controllable by the setting or releasing of the emergency brake member.

A further object of the invention is to provide a device of relatively simple construction having a minimum number of moving parts and one which is capable of being produced at relatively low cost.

Another and more specific object of the present invention is to provide a warning means of the foregoing character which is particularly adapted for use with a common type of automobile hand or emergency brake. Brakes of the type for which the present invention is particularly adapted are actuated by longitudinal reciprocating movement of a brake operating shaft having a handle means at its rearward end and being operatively connected at its forward end with the brake means. The operating shaft is mounted in a tubular housing to move longitudinally forward and rearward between brake releasing and brake engaging positions respectively and is provided with a projecting movement limiting stud or member which rides within a movement limiting slot extending longitudinally within the housing to limit the travel of the stud and shaft.

Another object of the invention is to provide a warning signal device adapted to be mounted on the brake shaft housing, the signal being controlled by means of a spring actuated device adapted to be engaged by the longitudinally movable stud or pin on the handbrake shaft to interrupt the signal or render it inoperative when the stud or pin has been moved to a predetermined position upon fully releasing the brake operator.

Other objects of this invention will appear in the following description and appended claims, reference being had to the accompanying drawings forming a part of this specification wherein like reference characters designate corresponding parts in the several views.

A preferred construction and application of the present invention is illustrated by way of example in the drawings wherein:

Fig. 1 is a fragmentary vertical section through the dash panel of a modern automobile vehicle body, showing the mounting of a conventional vehicle hand brake actuating mechanism and a warning device mounted thereon and constructed in accordance with the present invention.

Fig. 2 is a fragmentary enlarged section taken in the direction of the arrows substantially along the broken line 2—2 of Fig. 1, showing the warning device of Fig. 1 substantially in front elevation.

Fig. 3 is a fragmentary section taken in the direction of the arrow substantially along the broken line 3—3 of Fig. 2, but showing the warning device removed from the hand brake actuating mechanism.

Fig. 4 is substantially a fragmentary plan view of the warning device shown in Fig. 3.

Fig. 5 is a fragmentary enlarged vertical median section through the slide valve chamber, showing the slide valve element in the closed position as shown in Fig. 3.

Fig. 6 is a fragmentary section similar to Fig. 5, showing the slide valve element in the open position.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Figs. 1 and 2, a commonly employed mounting for an automobile hand brake actuating lever or shaft 10 is illustrated wherein a rearwardly inclined tubular housing 12 for the shaft 10 is provided with an exteriorly screw threaded forward end 14 projecting from the interior of the automobile body through the dash panel 16 into the engine compartment. The panel 16 as customarily employed comprises a sheet metal partition separating the front seat or driver's compartment from the forward engine compartment and is usually provided with an interior dash mat 18 adapted to insulate the driver's compartment from heat, noise and vibration of the engine compartment.

The threaded end 14 also passes through a suitable reinforcing bracket 20 adjacent the panel 16 and suitably secured to a rigid portion of the vehicle frame in accordance with conventional practice. Forward and rearward nuts 22 and 24 respectively are screwed on the threaded portion 14 and are drawn tightly toward each other to clamp therebetween portions of the panel 16 and bracket element 20. The mat 18 is customarily formed snugly around the portions of the housing 12, 14 adjacent the interior surface of the panel 16, but is broken away in Fig. 1 to show details of the mounting for the said housing.

The shaft 10 is slidable within the housing 12, 14 between forward and rearward brake releasing and brake engaging positions respectively, and is also mounted for pivoting about its longitudinal axis to permit setting or locking of the brakes as described below. Serving in effect as a forward extension of the shaft 10 is a lower forward actuating shaft 26 having its rear upper end slidable longitudinally within the forward portions of the housing 12, 14 and being suitably secured to the forward extremity of the shaft 10 for longitudinal sliding movement therewith. The actuating shaft 26 extends from the forward opening of the tubular housing end 14 and is operatively coupled at its lower end with the brake means to release or engage the same in accordance with conventional practice upon the aforementioned forward or rearward movement of the shaft 10 to the brake releasing or brake engaging positions respectively. As customary the farther the shaft 10 is pulled rearward, the greater will be the force of the braking action.

The upper portion of the housing 12, 14 is provided with a longitudinally extending movement limiting slot 28, Figs. 1 and 2, which starts near the mat 18 and extends rearward for at least a distance equal to the maximum longitudinal travel of the shaft 10 between the brake releasing and brake engaging positions. Suitably secured to the shaft 10 for movement therewith is a radially projecting movement limiting stud or pin 30 adapted to ride within the slot 28 to limit the longitudinal and pivotal movements of the shaft 10.

In the usual instance, the shaft 10 is provided with a handle means 32 at its rearward extremity and a plurality of teeth or notches 34 extending longitudinally of the shaft 10 along one side thereof. When the shaft 10 is pulled rearwardly to engage the brakes, a quarter turn of the shaft 10 will lock the brakes by engaging the notches 34 with a retaining dog, not shown. The notches 34 will be disengaged from the retaining dog to permit forward movement of the shaft 10 to the brake releasing position upon a quarter turn thereof in the opposite direction. The transverse width of the slot 28 is approximately a quarter sector of the housing 12 for substantially the entire length of the slot 28. The limited quarter-turn pivotal movement of the shaft 10 is thus permitted at substantially any longitudinal position of the pin 30.

The warning means in the present instance comprises a casting or body having an upper whistle chamber 36 and a lower clamping bracket indicated generally by the numeral 38. The latter includes arcuate yoke portions or webbed gripping arms 38a and 38b adapted for partially encircling the upper portion of the housing 12. The longer arm 38a has an arcuate interior gripping surface conforming to the curvature of the housing 12 and extending partially around the side portions thereof which do not contain the slot 28. The distal end of the arm 38a comprises a tongue 38c of reduced thickness longitudinally of the housing 12. The arm 38b is adapted to overlie the upper quarter sector of the housing 12 containing the slot 28. The interior surface of the arm 38b is curved concentrically with the shaft 10 and housing 12 and is spaced radially therefrom to provide a clearance 40 within which the projecting stud or pin 30 is free to move.

Underlying the arms 38a and 38b is a lower pivotal clamping arm 42 having an inner arcuate surface conforming to the under surface of the housing 12 below the slot 28. One end of the arm 42 comprises a yoke pivotally connected at 44 to the tongue 38c and is in essence a pivotal extension of the arm 38a. The other end of the arm 42 is adapted to be drawn toward the lower extremity of the arm 38b, as for example by a clamping screw 46 having its head countersunk within the arm 42 at 48 and its body passing through a bore 50 within the arm 42 and screwed into a threaded bore 52 within the lower extremity of the arm 38b. Thus the cooperating arms 38a and 38b and clamping arm 42 substantially encircle the housing 12 and frictionally engage the sidewalls thereof on either side of the longitudinally extending slot 28 so as to clamp the casting or body 36, 38 securely to the housing 12. The arms 38b and 42 are dimensioned so that their adjacent extremities are spaced by a gap 54, assuring optimum clamping action between the yoke arm 38b and arm 42 upon tightening of the screw 46.

The whistle chamber 36 may be formed to comprise a conventional air whistle, having in this case an upper air inlet opening 56, Fig. 4, and a lower air discharge opening or conduit 58 communicating with a valve chamber 60 extending longitudinally of the shaft 10. The chamber 60 opens at its forward end through the sidewall of the casting 36, 38 and extends rearwardly into a boss 62 of the casting 36, 38. Extending upright from the boss 62 is a tubular conduit or connector 64 communicating at its lower end with the valve chamber 60 and being adapted to be connected at its upper end with one end of a flexible air hose 66, whereby the valve chamber 60 may be suitably connected with a region of low pressure, such as the automobile engine manifold pressure. This is accomplished in the present instance by means of a T-connection 68 which splices the other end of the hose 66 to the conventional flexible tube 70 employed between the engine manifold or other engine controlled source of low pressure and the windshield wiper mechanism for actuation of the latter.

Operation of the whistle element to issue a soft warning whistle upon passage of air through the opening 56 into the chamber 36 is controlled by a suitable slide valve 72 movable longitudinally within the valve chamber 60 and providing an end closure plunger 74 slidably mounted within the forward opening of the chamber 60 and snugly fitting therein to close the same. The other end of the member 72 is provided with a similar plunger 76 slidable within the chamber 60 and dimensioned to fit snugly therein, so as to prevent any substantial passage of air between the plunger element 76 and the sidewalls of the chamber 60. The body of the element 72 between the plunger portions 74 and 76 is reduced in diameter with respect to the chamber 60 to permit air flow freely within the latter between the elements 74 and 76.

The forward extremity of the plunger 74 extends from the chamber 60 and is suitably secured, as for example by a rivet 78, to the lower end of an upright spring arm 80. The upper end of the spring arm 80 is suitably secured as by a rivet 82 to a projecting boss 84 of the whistle chamber 36. Overlying the slot 28 and extending substantially to the forward end thereof from the lower end of the spring arm 80 is a valve actuating extension 86 having a downturned finger or flange 88 adapted to be engaged by the stud or pin 30 when the latter approaches the forward limit of movement permitted by the slot 28, Fig. 1.

As indicated in Figs. 3 and 5, the slide valve 72 and plungers 74 and 76 are dimensioned so that upon forward movement of valve 72 to the closure position, the plunger 76 will overlie and close the opening of the conduit 64 into the chamber 60. The valve chamber 60 extends rearwardly of the conduit 64 into the boss 62 sufficiently to receive the plunger 76 at the rearward open position, Fig. 6, whereat the discharge conduit 58 of the whistle and the conduit 64 are in communication through the chamber 60 around the reduced body of the slide valve 72. At all positions of the valve 72, the plunger 74 will close the forward opening of the valve chamber 60 without interfering with the discharge conduit 58. It is thus apparent that with the slide valve 72 in the open position, atmospheric air will actuate the whistle by passing into the chamber 36 through the inlet opening 56 and discharging from the conduit 58 into the valve chamber 60, then through the connector conduit 64 and into the partial vacuum of the manifold via the tubular conduit 66, connector 68 and conduit 70.

The spring arm 80 is biased for normally holding the slide valve element 72 in the open rearward position, Fig. 6, whereat the arm 80 is in abutment with the adjacent forward wall of the casting 36, 38 and the depending pin engaging finger 88 is slightly rearward of the forward end of the slot 28. It is apparent from the construction shown that upon forward movement of the shaft 10 to the brake releasing position, the pin or stud 30 will engage the depending finger 88 and move the same and the connected valve 72 to the forward position, Figs. 3 and 5. Accordingly actuation of the whistle means within the chamber 36 is prevented when the shaft 10 is in the forward or brake releasing position and the brake is completely "off" or disengaged.

When the brake handle 32 and shaft 10 are pulled rearwardly to set the brake as described above, the pin 30 will be moved rearwardly from the finger 88, permitting return of the spring arm 80 to its position of abutment with the forward wall of the casting 36, 38, Fig. 6, and simultaneous movement of the slide valve 72 to its open position. If the automobile engine is running, air will then pass into the whistle means through the inlet 56 and to the manifold low pressure via the discharge port 58, ducts 64, 68 and 70 as described, emitting a soft whistle to warn the operator that the emergency brake has not been completely released.

Although in the present instance the spring arm 80 is biased for resiliently holding the slide valve element 72 in the open position, with the depending finger 88 of the actuating arm 86 projecting into the path of forward movement of the stud 30, it will be apparent from the foregoing that the present invention is not dependent on this construction. For example, instead of the resiliently urged movement of the valve 72 to the open position, an operative connection between a whistle valve element and the stud 30 may be readily provided which will positively move the valve to the open position upon rearward movement of the stud 30 from its foremost brake releasing position. In this situation, suitable means such as a spring for example will preferably be provided for yieldingly urging the stud engaging means and valve element to the closed position upon return of the stud 30 to the limit of its forward movement permitted by the slot 28.

Likewise other suitable means may replace the preferred air whistle as the warning device. By way of example, the valve 72 may be replaced by an electric switch in an operative electric circuit for actuating an electrically operated signal means when the hand brake is applied. In this situation, the signal circuit will also preferably be connected with the ignition system so as to be operated only when the latter is turned on. Thus the warning will not issue when the automobile is parked with the ignition off.

I claim:

1. In a warning device for an automobile handbrake of the type comprising a lever housing having a movement limiting slot extending longitudinally within the sidewalls thereof, a brake actuating lever movable longitudinally within the housing between braking and releasing positions and having a movement limiting member projecting into the slot for riding therein, the combination of an air whistle attachable to the housing, a valve chamber in communication with the whistle and adapted to be operatively connected with the automobile engine manifold pressure for actuation of the whistle, a valve element associated with the chamber and operative between open and closed positions respectively for selectively connecting and disconnecting the whistle from the manifold pressure, a valve actuating member operatively coupled with the valve element and reciprocal longitudinally of the slot between open and closed positions for moving the valve element correspondingly between its open and closed positions, resilient means yieldingly urging the valve actuating member to the open position, said valve actuating member having a portion overlying the slot in position to be moved by said movement limiting member to the closed position upon movement of the brake actuating lever to the brake releasing position.

2. In a warning device for an automobile handbrake of the type comprising a housing having a longitudinally extending movement limiting slot therein and a brake actuating lever mounted within the housing for forward and rearward movement longitudinally of the slot between brake releasing and brake engaging positions respectively, the lever having a movement limiting member projecting into the slot to ride therein as a unit with the lever between the brake releasing and engaging positions, the combination of an air whistle comprising a body having a bracket attachable to the housing, a discharge outlet for the whistle adapted to be connected with the engine manifold pressure, valve means associated with the whistle and movable between closed and open positions for selectively controlling the passage of air through the whistle, a spring arm mounted on the whistle housing for movement between two positions and operatively connected with the valve means for moving the same correspondingly between closed and open positions, the spring arm being biased for normally holding the valve means yieldingly in its open position and having a portion projecting into the path of forward movement of the movement limiting member to be moved thereby to its other position upon release of the brake.

3. In a warning device for an automobile handbrake of the type having a brake actuating lever movable between braking and releasing positions and having a movement limiting member projecting from the lever, the combination of an air whistle adapted to be connected to means for passing air through the whistle for operation thereof when the automobile engine is running, valve means associated with the whistle and movable between open and closed positions to control the passage of air through the whistle, a spring arm operatively coupled with the valve means for moving the same between said open and closed positions and yieldingly holding the valve means in the open position, the spring arm having a portion projecting into the path of the movement limiting member to be moved thereby to the closed position upon movement of the brake actuating lever to the brake releasing position.

4. In a warning device for an automobile handbrake of the type comprising a lever housing having a movement limiting slot therein, a brake actuating lever movable within the housing between braking and releasing positions and having a movement limiting member projecting into the slot for riding therein, an air whistle comprising a body, means for mounting the body on the housing, means for passing air through the whistle for operation thereof when the automobile engine is running, valve means associated with the whistle and movable between open and closed positions to control the passage of air through the whistle, a spring arm mounted on the whistle body and operatively coupled with the valve means for moving the same between said open and closed positions, said spring arm being biased to hold the valve means yieldingly in the open position and having a portion projecting into the path of the movement limiting member to be moved thereby to the closed position upon movement of the brake actuating lever to the brake releasing position.

5. In a warning signal for a vehicle brake, a linearly movable brake actuating lever having a projecting element, a signal device, means for mounting said device adjacent said lever, a member shiftable into one position for rendering said signal device operative and shiftable into a second position for rendering the signal device inoperative, a spring connected to said member for yieldingly shifting the same to the first position and having means disposed in the path of movement of said element and actuated thereby for shifting said member to the second position when said lever is actuated to release the brake.

6. In a warning signal for a vehicle brake having a manually operable member shiftable into positions to set the brake and provided with a projecting element, an air operated whistle device, means for mounting said device adjacent said manually operable member, a conduit connecting said device to the engine manifold, a shiftable valve for opening or closing said conduit, means yieldingly urging the valve to the position for opening the conduit including a spring having a portion attached to said first named means at a fixed point, the spring having a movable portion connected to the valve and yieldable to shift the valve to the position for closing the conduit and also having a movable portion in the path of said projecting element for movement thereby to shift the valve to the last named position when the brake is released.

7. In a warning device for an automobile handbrake having a shiftable brake operating lever and a movement limiting stud projecting from the lever, a supporting body having signal means, an operating member for the signal means shiftable into a first position for rendering said signal means operative and shiftable into a second position for rendering the signal means inoperative, spring means connected to said body at a fixed point and to the member for yieldingly urging the latter to said first position, said spring means having a portion in the path of said stud and movable thereby to shift the operating member to said second position upon movement of the lever to release the brake.

8. In a warning device for an automobile handbrake having a shiftable brake operating lever and a movement limiting stud projecting from the lever, a signal means, a shiftable operating member for the signal means, a spring arm connected to the signal means and also to the operating member for yieldably urging the same to a position for operating the signal means, said spring arm having a portion in the path of said projecting stud and movable thereby to shift the operating member to a second position for rendering the signal means inoperative upon movement of the lever to release the brake.

9. In a warning device for an automobile handbrake having a brake operating lever movable rearward to apply the brakes and movable forward to release the brakes and also having a movement limiting element secured to the lever for movement therewith, signal means having a body, a shiftable operating member for the signal means movable rearward to a whistle operating position and movable forward out of said whistle operating position, a spring arm having a fixed end connected to said body and having a movable portion connected to the member for moving the same to and from said whistle operating position, the spring arm being biased to urge the member rearward to the whistle operating position and having a portion in the path of forward movement of the movement limiting element for movement thereby to shift said member out of said whistle operating position upon forward movement of the lever to release the brake.

JAMES W. ANDERSON, JR.

REFERENCES CITED

The following references are of record in the file of this patent:

UNITED STATES PATENTS

| Number | Name | Date |
|---|---|---|
| 2,154,929 | Edwards | Apr. 18, 1939 |
| 2,361,361 | Sarnes | Oct. 24, 1944 |